United States Patent [19]
Tran

[11] Patent Number: 5,862,611
[45] Date of Patent: Jan. 26, 1999

[54] APPARATUS AND METHOD FOR COOLING A GRANULAR MATERIAL USING AMBIENT AIR

[76] Inventor: Sa Cao Tran, 1605 Lagoon Rd., Lakeland, Fla. 33803

[21] Appl. No.: 665,236

[22] Filed: Jun. 17, 1996

[51] Int. Cl.[6] .................................................. F26B 7/00
[52] U.S. Cl. .............................. 34/395; 34/394; 34/393; 34/392; 34/168; 34/166; 34/67; 34/66
[58] Field of Search .................................... 34/62, 63, 65, 34/66, 67, 131, 164, 166, 167, 168, 392, 393, 394, 395

[56] References Cited

U.S. PATENT DOCUMENTS

| | | | |
|---|---|---|---|
| 265,552 | 10/1882 | Abbot | 34/391 |
| 764,805 | 7/1904 | Graves | 239/672 |
| 2,435,927 | 2/1948 | Manning | 241/17 |
| 2,458,357 | 1/1949 | Evans | 502/45 |
| 4,126,946 | 11/1978 | Buffington | 34/395 |
| 4,187,988 | 2/1980 | Brackbill | 210/808 |
| 4,205,792 | 6/1980 | Horst | 239/679 |
| 4,791,735 | 12/1988 | Forberg | 34/181 |
| 4,869,162 | 9/1989 | Schouten | 99/471 |
| 5,220,732 | 6/1993 | Lee | 34/392 |
| 5,551,167 | 9/1996 | Van Fosser | 34/491 |
| 5,701,683 | 12/1997 | Wilhelm | 34/394 |

*Primary Examiner*—Henry Bennett
*Assistant Examiner*—Pamela A. Wilson
*Attorney, Agent, or Firm*—Dinesh Agarwal

[57] ABSTRACT

An apparatus and method for cooling a granular material, such as a phosphate fertilizer, using ambient air is disclosed. The apparatus includes a cooling device and a conveyor assembly for feeding the material. The cooling device includes a rotatable assembly for receiving and spreading the material in the ambient air. The rotatable assembly is comprised of radiating fins with alternating recesses.

22 Claims, 3 Drawing Sheets

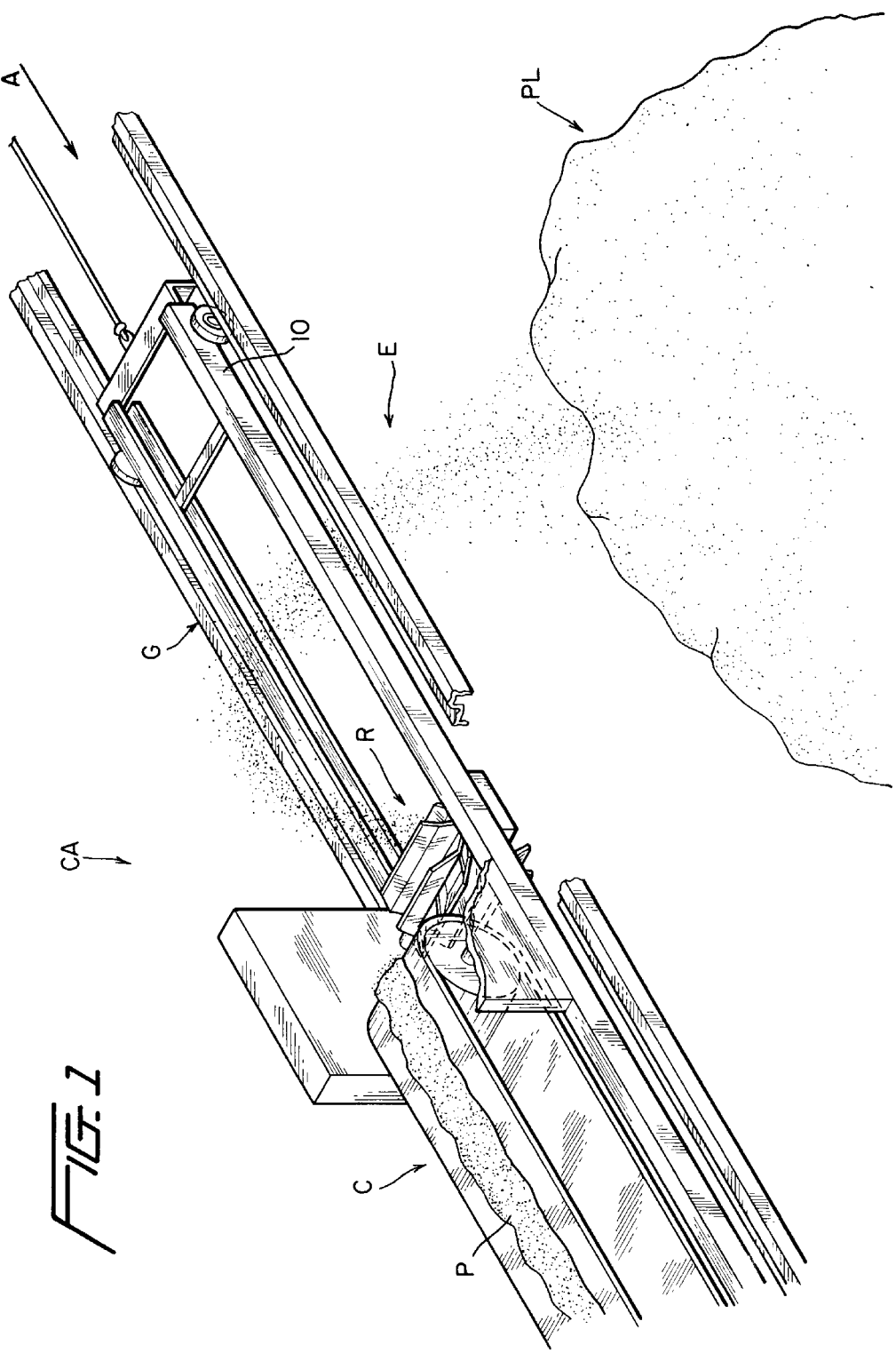

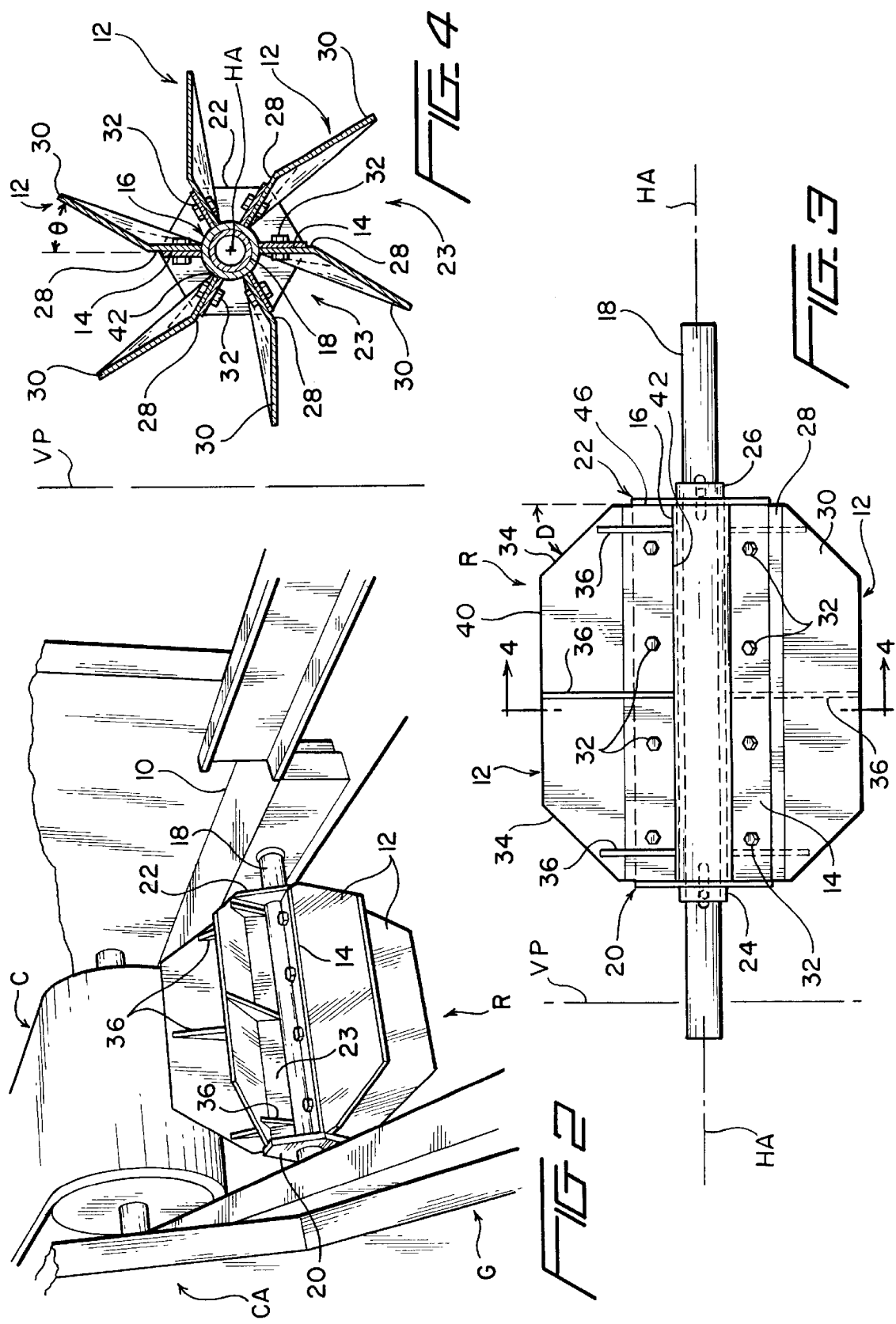

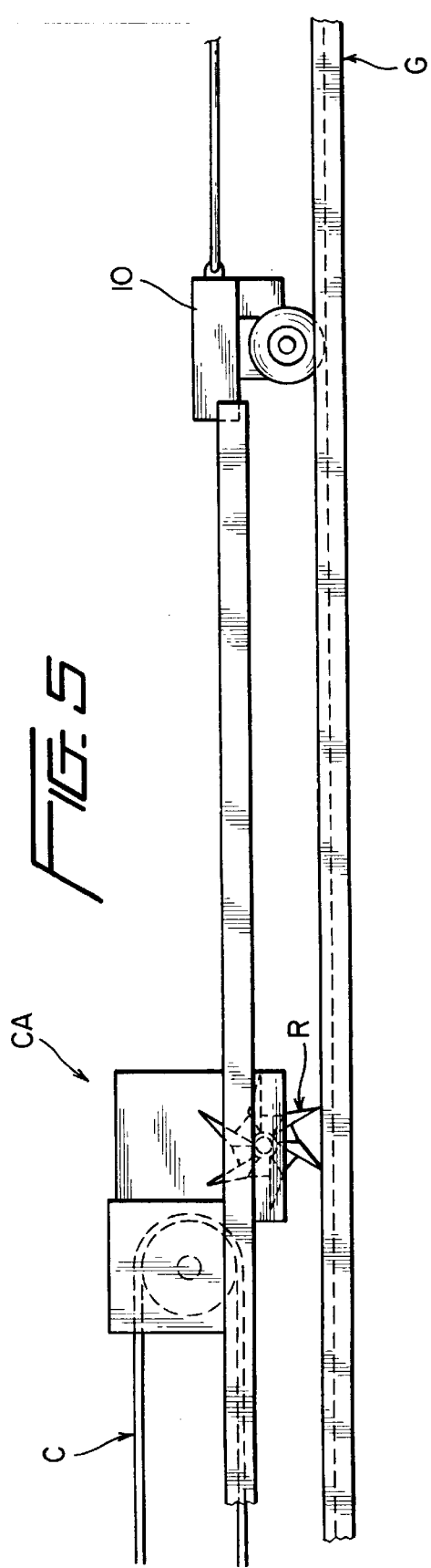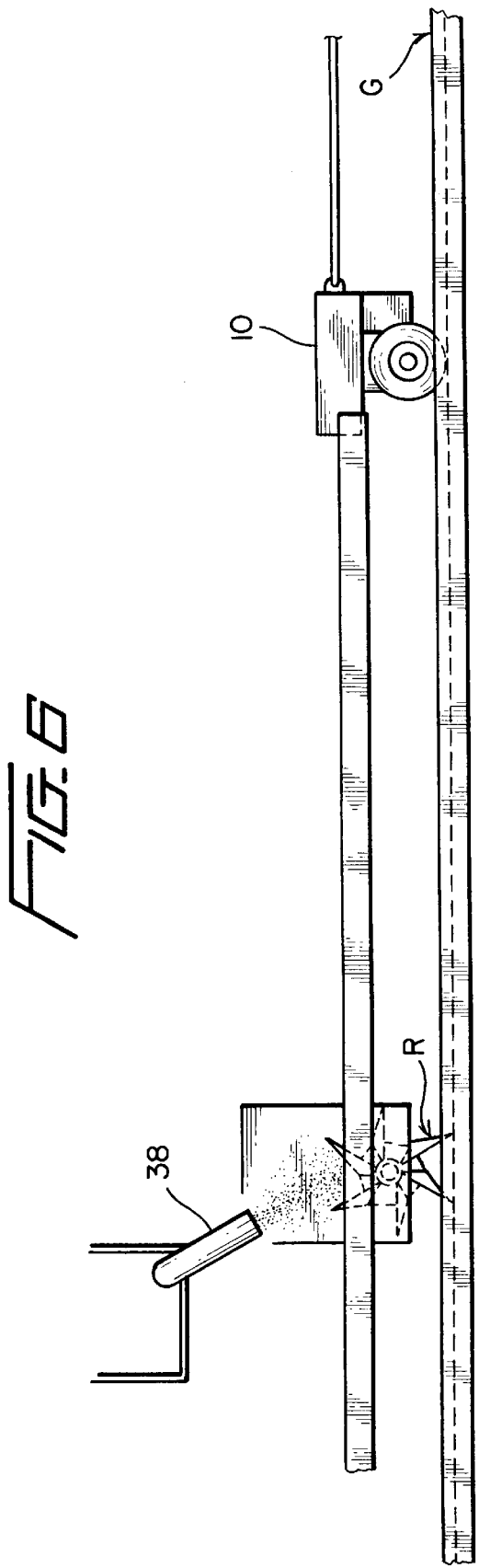

APPARATUS AND METHOD FOR COOLING A GRANULAR MATERIAL USING AMBIENT AIR

FIELD AND HISTORICAL BACKGROUND OF THE INVENTION

The present invention is directed to cooling granular or the like materials using ambient air, and more particularly to an apparatus and method for cooling a granular material, such as a phosphate fertilizer.

In fertilizer production, it is important that the freshly made fertilizer, such as diammonium phosphate (DAP), monoammoniumphosphate (MAP), etc, be cooled properly for an effective evaporation of the residual water from the fertilizer granules. Although the fertilizer coming out from the end of a production cycle is generally at a temperature of about 195° to 210° F. and appears dry, there is residual water inside each individual granule. Further, while the process of water migrating from inside a granule to its outside skin is continuous and ongoing, if the internal residual water does not have a way to escape, or if insufficient evaporation takes place, the apparently dry granules remain wet. If the fertilizer in this wet condition is allowed to be stored, the granules tend to stick together in a pile causing the fertilizer caking problem. Typically, freshly made fertilizer is stored in buildings, rail cars, or barges for shipping and handling, where the caking takes place.

In fertilizer industry, the caking problem could be severe in that it is not uncommon to break loose the piles of fertilizer using dynamite. It is known to have taken days, instead of minutes, to unload railcars and trucks due to the fertilizer caking. The caking of fertilizer not only is undesirable from the quality standpoint, but leads to unnecessary expenses that must be incurred under these circumstances.

In order to solve the caking problem, many dry product coolers have been designed. The most common cooler in fertilizer plants is the Countercurrent Rotary Drum Cooler. The other less commonly used devices include Fluid Bed Cooler, Heat Exchanger Fluidized Bed, and the Bulk Flow Plate Heat Exchanger. These coolers are huge and heavy, costly to build and install and to maintain and operate. A complete conventional cooling system is known to cost several million dollars.

U.S. Pat. Nos. 265,552; 764,805; 2,435,927; 2,458,357; 4,126,946; 4,187,988; and 4,205,792, are directed to various drying, cooling and distributing devices.

In view of the problems associated with conventional techniques, there is a need in the industry for an efficient method and device for preventing fertilizer caking which is simple in design, economical, easy to operate and inexpensive to maintain.

OBJECTS AND BRIEF SUMMARY OF THE INVENTION

The principal object of the present invention is to provide an apparatus and method for cooling a granular or the like material, such as a phosphate fertilizer, using ambient air, which overcomes the disadvantages of conventional techniques and devices.

Another object of the present invention is to provide an apparatus and method for cooling a granular material, such as a fertilizer, which promotes evaporation of and effectively removes residual water from individual granules.

Yet another object of the present invention is to provide an apparatus and method for cooling a granular material which promotes evaporation of inside water from the granules thereby effectively and sufficiently cooling the material.

A further object of the present invention is to provide an apparatus and method which uses ambient air for cooling a chemical product, such as a granular or the like material.

Yet a further object of the present invention is to provide an apparatus and method which eliminates the need for an external source for cooling a product, such as a granular or the like material.

An additional object of the present invention is to provide an apparatus and method for cooling a granular material which prevents caking of the material during storage or shipping.

Yet an additional object of the present invention is to provide an apparatus and method for cooling a granular material which is significantly light-weight compared with conventional coolers.

Still yet an additional object of the present invention is to provide an apparatus and method for cooling a granular material which is simple in design, costs significantly less to make, easy to install, and inexpensive to operate and maintain.

A further object of the present invention is to provide an apparatus and method for cooling a granular material which is highly flexible and extremely adaptable for various requirements and applications.

Yet a further object of the present invention is to provide an apparatus and method for cooling a granular material in which the product can not be trapped by the cooler regardless of the throughput load. This eliminates the bottle neck problem generally seen in the conventional devices. In the worst case, if the throughput load is substantially increased to cause the cooling effect to decrease, this can be compensated by simply adjusting the cooler speed and/or changing the blade size. The conventional coolers, on the other hand, are rigid in design. They are designed for certain throughput load relative to certain cooling levels. For instance, in the conventional Rotary Drum Cooler Design, the product and air are enveloped inside the cooler housing and they flow in opposite directions (counter-flow). If the product throughput load is increased (more than its original design capacity), the original volume of air flow will not be enough to cool the product. However, if the air volume is increased by raising the air velocity in an attempt to keep the product cool, the cooler will discharge less product because the strong air will push product back (flow against product). In other words, once the drum cooler is designed and installed its capacity is fixed (cooling effect vs. throughput load), and the user will be faced with the following situations:

if the production is pushed for higher rates, the throughput load to the conventional cooler must increase and the product, therefore, does not cool sufficiently. The potential for product caking would therefore be significant.

if the cooling factor is a necessary requirement, the conventional drum coolers can not satisfy the problem and production demand. Thus, the product shortage is unavoidable unless a bigger drum cooler unit is used.

To change a plant's existing undersized conventional cooler for a bigger unit is very costly and unfavorable choice (capital, substantial plan modification, long downtime, etc.).

Further, in some situations due to the space limitation, it is impractical and prohibitive to install a bigger conventional cooler unit.

An additional object of the present invention is to provide an apparatus and method for cooling a granular material which can be used in conjunction with a continuously movable conveyor belt or tripper. This unique design leads to improved evaporation of water and therefore effective cooling of the fertilizer granules for thereby preventing the caking problem. In other words, this particular design optimizes the cooling effect.

Yet an additional object of the present invention is to provide an apparatus and method for cooling a granular material which consumes significantly lower amount of energy and is therefore energy efficient leading to significant cost savings.

Yet an additional object of the present invention is to provide an apparatus and method for cooling a granular material which is versatile in that it can be used for any solid product utilizing heat exchange application for any plant.

In summary, the main object of the present invention is to provide an apparatus and method for cooling a granular or the like material, such as a phosphate fertilizer, using ambient air, which is simple and cost-effective to design, easy to install and operate, energy efficient, economical, versatile for several applications, inexpensive to make and maintain, and which prevents caking of the product during storage or shipping.

BRIEF DESCRIPTION OF THE DRAWINGS

The above and other objects and advantages and novel features of the present invention will become apparent from the following detailed description of the preferred embodiment of the invention illustrated in the accompanying drawings, wherein:

FIG. 1 is side perspective view of the cooling apparatus of the invention;

FIG. 2 is a partial enlarged front elevational view of the apparatus of the invention taken in the direction of arrow A in FIG. 1;

FIG. 3 is an enlarged front elevational view of the rotatable assembly used in the apparatus of the present invention;

FIG. 4 is a cross-sectional view taken along line 4—4 of FIG. 3;

FIG. 5 is a side elevational view of the apparatus shown in FIG. 1; and

FIG. 6 is an alternative embodiment of the apparatus of the invention.

DETAILED DESCRIPTION OF THE INVENTION

The present invention prevents the fertilizer caking problem by appropriately and properly cooling down the product. This is done by removing the residual water from individual granules by enhancing and improving the overall evaporation effect. The evaporation effect depends directly on the granules/air area of contact or, the effective evaporation surface area. In other words, it relates to the total number of granules being exposed to the air and their retention time in the air. This is achieved by maximizing the number of granules being exposed to the air by spreading as many granules as possible either tangentially or radially into the air and, maximizing the retention time in the air by providing a long travel path for the granules to fly and fall freely after spreading in the air. These concepts/principles of operation are achieved by the novel apparatus of the invention described below.

As shown in FIG. 1, the cooling apparatus CA of the invention includes conventional conveyor assembly C and rotatable assembly R mounted on carriage assembly G. Typically, the cooling apparatus would be a part of the overall fertilizer production assembly and is provided at the end of the production cycle. In particular, carriage assembly G would be supported from a building structure at a height of about 20 to 40 feet above the floor in a storage area. Preferably, the cooling apparatus is located at the end of the product manufacturing assembly such that the conveyor C would receive the product to transfer it onto the rotatable assembly R for distribution in the air and ultimate discharge directly to the storage floor below.

As one of ordinary skill in the art would appreciate that the product, such as a fertilizer, would form a pile PL upon falling on the floor. Accordingly, it will be desirable to move the rotatable assembly R and conveyor C relative to the floor below. Therefore, carriage assembly G includes movable sub-assembly 10 (FIG. 5).

As best shown in FIGS. 2–4, the rotatable assembly R includes blades or fins 12 mounted on plates 14. As best shown in FIG. 4, plates 14 radiate outwardly from the exterior surface of pipe 16, and a shaft or axial member 18 passes through pipe 16 and is connected in a conventional manner to sub-assembly 10. As best shown in FIG. 3, two generally hexagonal end plates 20 and 22 are provided on left and right sides of rotatable assembly R. Two hubs 24 and 26 are capped over the ends of pipe 16 and are locked thereon in a conventional manner. Although FIG. 4 shows providing six fins, it is within the scope of this invention to vary the number thereof. Preferably, the number of blades ranges from four to eight blades. The rotatable assembly R is rotatable in a generally vertical plane VP about a generally horizontal axis HA (FIGS. 3–4).

As best seen in FIGS. 2 and 4, blades 12 together with end plates 20 and 22, define recesses 23 which are alternately disposed with the blades. The recesses 23 function as pockets for receiving the material from conveyor C until it is ultimately discharged or spread in the ambient air.

Each blade or fin 12 includes a first base section 28 and a second outward section 30 bent at an angle relative thereto. In particular, section 30 extends at an angle B, which is about 20°–45° relative to the base section 28. Preferably, section 30 is bent at an angle of about 30°. As further shown in FIG. 4, each blade or fin 12 is mounted on corresponding support plate 14 using conventional fasteners 32. It is noted that although the preferred embodiment shown herein illustrates blades to be of bent type, it is within the scope of this invention to provide straight blades.

Each blade or fin 12 includes a top edge 40, bottom edge 42, a left side edge 44, and a right side edge 46 (FIG. 3).

As best shown in FIG. 3, outward section 30 of each blade 12 includes corners 34 cut an angle D, which could range up to 60°, and preferably 45°.

As best shown in FIG. 2, each blade 12 includes preferably three reinforcing plates 36 extending at generally right angle to the surface thereof.

In an alternative embodiment shown in FIG. 6, conveyor C is replaced by an overhead discharge chute 38 for feeding the product to the rotatable assembly R.

Although the blades or fins are shown herein mounted such that the outward section 30 is angled away from conveyor C, it is within the scope of this invention to mount the blades backwards in a manner that sections 30 extend or angle back towards the conveyor C. Preferably, each blade is about 10–12 inches in width and 24–48 in length.

OPERATION

During operation, the freshly made fertilizer granules P are discharged onto conveyor C which then feeds it to rotatable assembly R. The assembly R is rotated at a preferable speed of 300–400 rpm for an optimum performance. (It should be noted that the speed could be varied if desired. In this regard, it is further noted that since the cooler speed affects its performance directly, it is essential to control the speed of the rotating assembly and by using variable speed device, the cooler speed can be controlled and is recommended.)

As noted above, the cooling apparatus CA is preferably positioned at an elevation of about 40 feet above the floor. The vertical height from the floor is important to provide sufficient discharge space for the granules to fly through the air and fall by gravity freely on the floor below. As the product falls on and in between the blades 12, it is, due to the rotation of assembly R, spread into the ambient air following initially an upward path and then gradually falling on the floor below by gravity along an elliptical path E (FIG. 1).

As noted above, the main goal of the invention is to remove the residual water from the product granules to achieve an optimum cooling effect to thereby prevent the caking problem. As one of ordinary skill in the art would appreciate that water removal requires evaporation, and evaporation generally depends on the granules/air area of contact or the overall effective evaporation surface area. In the present invention, the cooling of granules occurs in five distinct stages. The first heat exchange or cooling phase takes place because the granules are spread, fly through and rain in the air long before reaching the floor below. In addition to spreading, the cooler blades also perform the function of a fan to blow air into the stream of the product as soon as the granules are spread out. The migration of internal water from the granules improves significantly in this stage, as a result.

The second stage of cooling takes place upon the product reaching the floor. The heat exchange occurs between the floor and the elliptical pile of the product due to variance in their temperature gradient. In other words, since the already fallen product would be generally cooler than the product falling thereon, there would be a cooling effect due to the difference in temperature values.

The third phase of the cooling takes place because the cooling assembly R distributes the product in a large pattern to cover a large discharge area. The larger the discharge area covered by the granules, the slower is the process of pile build up down below. Since the pile is built up slowly, the granules have more exposure to the air before covered by other particle thereby allowing more time for evaporation.

The fourth heat exchange phase takes place as a result of the angle of repose of the product. When the pile is high enough, the granules will slide down slowly in all directions on the pile giving the product granules yet another opportunity to be exposed to the air and thus evaporate more water. The angle of repose would vary depending on a product's material property, size and shape, etc. For DAP fertilizer, the angle of repose is about 30°–35° F.

The fifth and the final heat exchange phase occurs by convection. Since the cooler is vertical, moist hot air rises from the product pile by convection thereby creating a vacuum effect in the area adjacent to the pile PL. This brings the surrounding cooler and drier air to the product pile increasing evaporation and heat exchange.

The net effect of the cooler's five-heat exchange phases is that the fertilizer is cooled down rapidly and significantly. A temperature drop of about 30° F. at an average cooler speed of about 300 rpm has been noted for granulated DAP in the first heat exchange phase. This was observed during the hot days in one summer season. The temperature drop would be higher in the cool season since the ambient air is much cooler. For instance, when the air inside the storage building was about 87° F., an initial temperature drop of 37° was noted with the cooler speed of only 264 rpm.

While this invention has been described as having a preferred design, it is understood that it is capable of further modifications, uses and/or adaptations of the invention following in general the principle of the invention and including such departures from the present disclosure as come within the known or customary practice in the art to which the invention pertains and as may be applied to the central features hereinbefore set forth, and fall within the scope of the invention and of the limits of the appended claims.

What is claimed is:

1. An apparatus for cooling a granular material using ambient air, comprising:
   a) means for cooling a granular material in the ambient air;
   b) means for feeding the granular material operably associated with said cooling means;
   c) said cooling means including means for receiving and spreading the granular material in the ambient air;
   d) said receiving and spreading means including a rotatable assembly; and
   e) said rotatable assembly including a plurality of fins defining therebetween recesses for receiving the granular material.

2. The apparatus of claim 1, wherein:
   a) said rotatable assembly is rotatable in a generally vertical plane.

3. The apparatus of claim 1, wherein:
   a) said fins radiate outwardly and rotate about a generally horizontal axis.

4. The apparatus of claim 1, wherein:
   a) at least one of said fins includes first and second sections; and
   b) said second section extends at an angle relative to said first section.

5. The apparatus of claim 4, wherein:
   a) at least one of said first and second sections is rectilinear in configuration.

6. The apparatus of claim 4, wherein:
   a) said second section extends at an angle of about 20°–45° relative to said first section.

7. The apparatus of claim 4, wherein:
   a) said second section extends at an angle of about 30° relative to said first section.

8. The apparatus of claim 4, wherein:
   a) the length of said second section is greater than the length of said first section.

9. The apparatus of claim 1, wherein:
   a) said rotatable assembly includes a generally horizontally extending shaft and at least one fin mounting plate extending radially therefrom; and
   b) at least one of said fins is removably mounted on said fin mounting plate.

10. The apparatus of claim 1, wherein:
    a) at least one of said fins includes top, bottom, left and right side edges, and left and right corner edges; and
    b) at least one of said left and right corner edges extends at an angle relative to one of the corresponding left and right side edges.

11. The apparatus of claim 10, wherein:
a) said at least one of said left and right corner edges extends at an angle of about up to 60°.

12. The apparatus of claim 10, wherein:
a) said at least one of said left and right corner edges extends at an angle of about 45°.

13. The apparatus of claim 1, wherein:
a) at least one of said fins includes a reinforcing rib.

14. The apparatus of claim 1, wherein:
a) said feeding means includes a conveyor located upstream of and vertically offset from said cooling means.

15. The apparatus of claim 14, and including:
a) means for supporting the apparatus; and
b) wherein the apparatus is movable relative to said apparatus supporting means.

16. The apparatus of claim 1, wherein:
a) said feeding means includes a material ejecting conduit means disposed about said cooling means.

17. The apparatus of claim 1, wherein:
a) said rotatable assembly is rotatable at a speed of about 300–400 rpm.

18. An apparatus for cooling a granular material using the ambient air, comprising:
a) a rotatable assembly for spreading a granular material in the ambient air;
b) a conveyor assembly for feeding the granular material operably associated with said rotatable assembly;
c) said rotatable assembly including an axial member and a plurality of fins radiating therefrom;
d) said axial member being disposed generally transverse to said conveyor assembly;
e) said fins defining therebetween alternating recesses for receiving the granular material; and
f) said conveyor assembly being positioned upstream of and vertically offset from said rotatable assembly; and
g) said rotatable assembly being rotatable in a generally vertical plane.

19. The apparatus of claim 18, wherein:
a) said axial member extends in a generally horizontal plane.

20. The apparatus of claim 18, wherein:
a) at least one of said fins is bent at an angle of about 20°–45°.

21. A method of cooling a granular material using ambient air, comprising the steps of:
a) providing a generally vertically rotatable cooling assembly having a plurality of fins defining therebetween alternating recesses;
b) providing a conveyor for feeding the granular material operably associated with said cooling assembly;
c) spreading the granular material in the ambient air by rotating said cooling assembly at a predetermined speed;
d) allowing the spread material to fall by gravity on a support surface; and
e) collecting the fallen material.

22. The method of claim 21, comprising the step of:
a) rotating the cooling assembly at a speed of about 300–400 rpm.

* * * * *